United States Patent [19]

Dietrich, Sr. et al.

[11] 4,397,475
[45] Aug. 9, 1983

[54] BUMPER HITCH WITH UNIVERSAL MOUNTING SUPPORT

[75] Inventors: William J. Dietrich, Sr., Congerville; Michael G. Kovach, Morton, both of Ill.

[73] Assignee: DMI, Inc., Goodfield, Ill.

[21] Appl. No.: 343,166

[22] Filed: Jan. 27, 1982

[51] Int. Cl.³ ............................................. B60D 1/00
[52] U.S. Cl. ..................................... 280/495; 280/501
[58] Field of Search ............. 280/495, 500, 501, 502, 280/505, 490 R, 407, 405 R, 478 R, 478 A

[56] References Cited

U.S. PATENT DOCUMENTS

| | | | |
|---|---|---|---|
| 2,064,615 | 12/1936 | Kuchar | 280/490 R |
| 2,753,193 | 7/1956 | Halverson | 280/501 |
| 3,984,123 | 10/1976 | Gonzalez | 280/495 |

*Primary Examiner*—John A. Pekar
*Attorney, Agent, or Firm*—Emrich, Lee, Brown & Hill

[57] ABSTRACT

A trailer hitch apparatus adapted to mount to the frame of a vehicle for towing a trailer includes a hitch frame having at least one forwardly extending member. A rear mounting bracket mountable to the hitch frame at a varying predetermined vertical position secures the hitch frame to the vehicle frame. A tow bar is affixed to the hitch frame for receiving a trailer. A forward brace, including an upward projecting portion and a laterally extending portion having an extendable abutment surface, is mountable at differing predetermined vertical and horizontal positions along the forward extending member. The laterally extending portion of the forward brace is mountable projecting inward or outward for positioning beneath vehicle frames of different widths. The extendable abutment surface is extendable to abut with the vehicle frame to spread towing loads over a greater portion of the vehicle frame and allowing compensation for wear. The hitch apparatus can be suspended at various predetermined positions beneath the towing vehicle. The forward brace can be mounted at varying horizontal positions to avoid obstructions beneath the vehicle frame.

12 Claims, 4 Drawing Figures

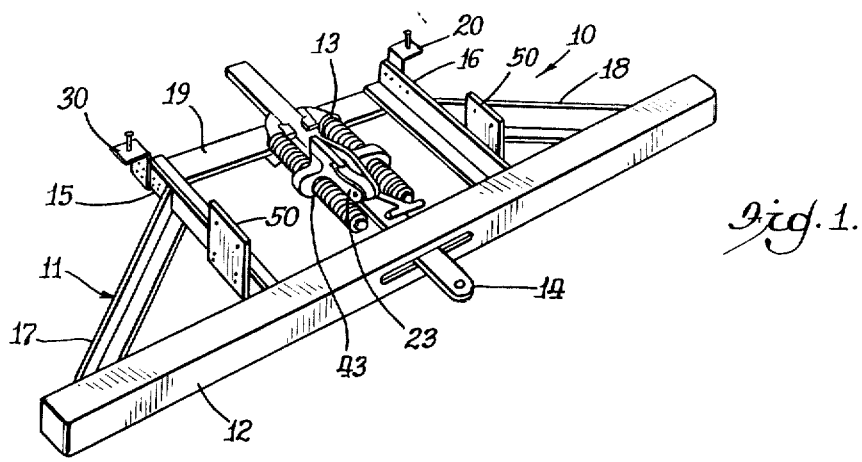
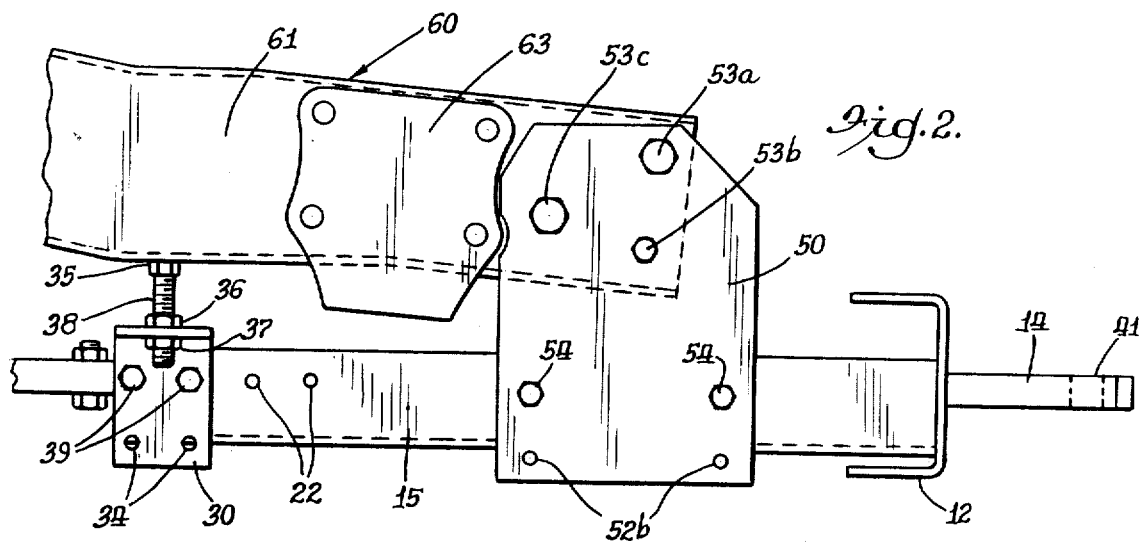
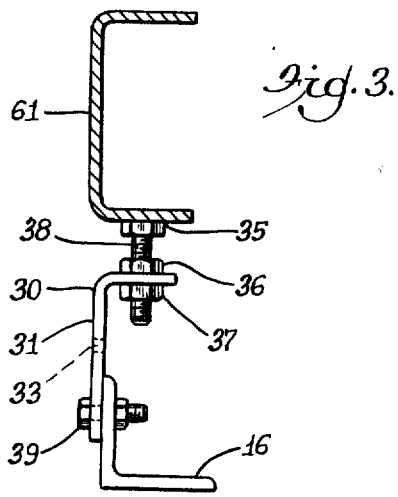
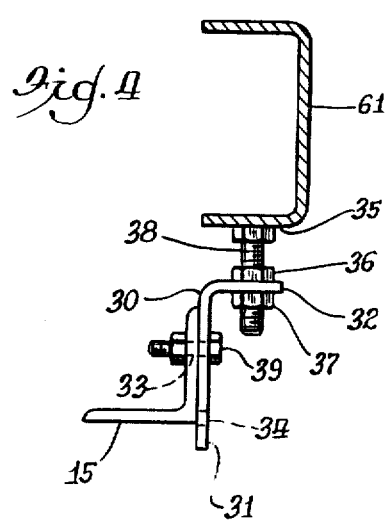

BUMPER HITCH WITH UNIVERSAL MOUNTING SUPPORT

BACKGROUND OF THE INVENTION

The present invention relates to improvements in trailer bumper hitch apparatus; and more particularly, the improvements relate to extendable hitches such as that disclosed in the Antici U.S. Pat. No. 3,140,881, issued July 14, 1964, and the Dietrich, Sr. U.S. Pat. No. 4,265,465, issued May 5, 1981. These patents disclose a trailer hitch which makes it easier to attach a trailer hitch drawbar to a trailer by utilizing two release mechanisms. One of these release mechanisms, when actuated, permits the drawbar to be moved longitudinally toward the rear so that it can be aligned with the hitch of the trailer. The other release mechanism permits the drawbar to be swung laterally in a rearwardly extended position—thus greatly increasing the range over which the drawbar can be connected to the trailer without moving either vehicle. These trailer hitches have the further advantage that no special maneuvering is required to reset both release mechanisms. When the towing vehicle turns, the release mechanism is reset, and when the towing vehicle brakes or slows down, the longitudinal release mechanisms operate independently of each other. These trailer hitches, and other similar extendable trailer hitches, have provided substantial convenience to users, particularly in the agricultural industry where trailer loads may be quite heavy, and the terrain on which it is desired to hitch a trailer to the towing vehicle may be rough or uneven.

Bumper hitches for trucks and the like are typically bolted to a short piece of the truck frame behind the rear spring shackle. The hitch frame extends rearwardly from its mounting on the truck frame to a drawbar or ball mount for securing the tongue of a trailer. No provision is made to reduce the leverage exerted on the bolts attaching the bumper to the truck frame due to the weight of the trailer on the drawbar or ball mount. Eventually, the trailer hitch will become canted towards the rear as the torque on the bolts attaching the bumper hitch to the truck frame elongate the holes through which they are secured. A common solution to the problem has been to weld the trailer hitch frame to the truck frame in front of the main rear brackets utilizing additional steel sheet supports or the like. However, these welds are usually less than ideal because the operator is welding on vertical surfaces beneath his vehicle, often in close proximity to vehicle fuel tanks. If the bumper is to be removed to transfer to a new truck it requires a torch to remove the bumper. Further the welds do not allow the hitch to be suspended at various positions beneath the vehicle frame or to be adjusted for wear in the rear bracket bolts.

The torque force exerted upon the bumper hitch frame and the vehicle frame is further accentuated during the use of extendable bumper hitch systems. Such systems generally have an extendable drawbar or the like capable of telescoping out 6 to 15 inches. When heavy drawbar loads are exerted on an extended drawbar the cantilever load on the end of the truck frame is magnified greatly.

Further, todays demands for greater fuel economy have produced lighter trucks with weaker frames. Such trucks are not able to withstand the cantilever forces exerted on a hitch without a means for distributing such a load over a greater portion of the truck frame.

SUMMARY OF THE INVENTION

The present invention provides an improved trailer hitch apparatus that reduces the cantilever load exerted on the end of a truck frame by the trailer hitch assembly and distributes the load over a greater area of the frame. Further, the present invention allows a standard configuration trailer hitch assembly to be adaptable to many vehicle applications. The hitch apparatus of the present invention includes a universal mounting support which is adjustable fore and aft, laterally inward and outward, and upward or downward as required for a particular vehicle. Further, the hitch apparatus need not be permanently affixed to the vehicle by welding, allowing for ease of removal.

Briefly, the trailer hitch apparatus of the present invention, adapted to mount beneath a towing vehicle having a horizontal vehicle frame, includes a hitch frame having at least one forwardly extending horizontal member. Rear mounting brackets project upwardly from the horizontal members where they are secured by bolts extending through corresponding holes in the rear brackets and forward extending member. The rear brackets affix the hitch frame to the vehicle frame by suitable means such as bolts extending through corresponding holes in the rear bracket and the vehicle frame. The apparatus further includes forward braces, having an L-shaped cross-sectional configuration, affixed to the apparatus frame by suitable means such as bolts extending through corresponding holes in the braces and the forwardly extending member. The L-shaped forward braces can be mounted on the frame such that they project inwardly or outwardly providing a lateral adjustment for varying vehicle frames. The horizontal member of the hitch frame is provided with varying hole patterns, corresponding to the hole pattern of the L-shaped braces, along their length such that the forward brackets may be positioned fore or aft along the hitch frame to avoid obstructions and weaknesses in the vehicle frame. Similarly, multiple hole patterns are provided vertically in the L-shaped braces, rear brackets or the forwardly extending member to allow the L-shaped braces and rear brackets to be mounted in different vertical positions as required for a particular vehicle frame or to suspend the trailer hitch apparatus at varying vertical distances beneath the vehicle frame.

Each L-shaped brace is provided with an adjustable abutment surface capable of moving upward or downward to abut against the vehicle frame. In one embodiment, a bolt extends upward from the L-shaped brace where it is secured within a hole in the bracket by lock nuts. The bolt can be screwed up and down such that the upper surface of the bolt abuts against the vehicle frame.

The universal mounting support of the present invention distributes the tow load over a larger area of the truck frame, thereby reducing the stress on the frame. The bumper hitch universal mounting support apparatus is readily adaptable to commercial units now in production and is readily installed by the purchaser of such equipment. The present invention allows the mounting of a bumper hitch of a single configuration on all current makes and models of trucks whether wide or narrow frames, two or four wheel drive. The hitch apparatus is not permanently affixed to a particular vehicle allowing for ease of removal, change in ground clearance, minor adjustment of abutment surfaces to level the hitch.

Other features and advantages of the present invention will be apparent from the following detailed description of a preferred embodiment accompanied by the attached drawings wherein identical reference numerals will refer to like parts in the various views.

BRIEF DESCRIPTION OF THE DRAWINGS

FIG. 1 is a perspective view of the improved bumper hitch assembly taken from the upper left side thereof;

FIG. 2 is a left side view of the apparatus of FIG. 1 showing the bed of the truck in fragmentary form;

FIG. 3 is a front view of the horizontal member of the hitch frame to which an inwardly projecting L-shaped forward brace is mounted in abutting relationship against a truck frame member; and FIG. 4 is a front view of the horizontal member to which an outwardly projecting L-shaped forward brace is mounted in abutting relationship against a truck frame member.

DETAILED DESCRIPTION

The present invention will be described in detail as an improved bumper hitch with universal mounting support as to its application to the bumper hitches revealed in Dietrich, Sr. U.S. Pat. No. 4,265,465 to Antici U.S. Pat. No. 3,140,881, with the understanding that the present disclosure is to be considered as an exemplification of the principles of the invention and is not intended to limit the embodiment illustrated. The teachings of the present disclosure are applicable to all bumper hitches having a frame means which include forwardly extending members.

Referring first to FIG. 1, reference numeral 10 generally designates a complete trailer bumper hitch according to the present invention. In general, it may be said to comprise a frame generally designated 11, a rear bumper 12, rear brackets 50, forward braces 30 and a draw bar assembly 13.

Turning first to the frame 10, it includes first and second forwardly extending angle members 15, 16 which are welded to bumper 12 and extend in the direction of travel of the vehicle. These members are braced by inclined angle members 17, 18 and a horizontal frame member 19, in the form of a flat steel bar which is welded to the forward ends of forwardly extending frame members 15, 16.

The described embodiment of the present invention is being made in regards to an improved bumper hitch assembly as revealed in the Antici and Dietrich, Sr. patents. Both Antici and Dietrich, Sr. disclose a bumper hitch assembly in which the towing bar, which is to secure the trailer thereto, is extendable to a rearward extended position and capable of being swung laterally so that it can be lined up with the hitch of the trailer. Draw bar assembly 13 is of the type described in Dietrich, Sr. U.S. Pat. No. 4,265,465.

The spring center casting 23 includes a center body portion 43 which slidably receives the draw bar 14. Spring assembly 13 cushions the movement of the draw bar 14 fore-and-aft reducing stress on the transmission, drive train and differential of the towing vehicle.

Referring now to FIG. 2, the bumper hitch apparatus 10 is shown mounted to a portion of a rear truck frame 60. Rear bracket 50 is secured to forwardly extending angle member 15 by means of securing bolts 54 extending through holes 52(a) (not shown). Rear bracket 50 extends upwardly adjacent to truck frame member 61 where it is secured behind the rear spring shackle 63 by means of securing bolts 53A-C.

In conventional bumper hitch assemblies, rear bracket 50 is the only means supporting the bumper hitch assembly 10. In such assemblies, towing loads exerted on towing bar 14 exert great cantilever stresses on bolts 53A-C. Normally the distance from hole 41 in draw bar 14 for securing a trailer, is 14 inches from the fulcrum point at point 53A. The distance between bolts 53A and 53C and 53B is normally less than 4 inches. The 14 inch lever arm of the draw bar has a more than 3-1 leverage factor on the bolts 53A-C. Extendable draw bars 14, as illustrated in FIG. 1 and disclosed in the Dietrich, Sr. and Antici patents, normally are extendable 11 inches from the bumper 12 to provide easy hook-up to a trailer without repositioning the truck. Further extension of the draw bar 14 increases the cantilever stresses on bolts 53A-C to more than 6-1 leverage factor. During hook-up operations on rough terrain with heavy loads, as is common in the agricultural applications of this invention, cantilever forces exerted on the tow bar can attain a great magnitude. Thus, the present invention has considerable importance to bumper hitch assemblies having extendable tow bars 14; however, it should not be considered limited to such applications.

The torque forces exerted upon bolts 53A-C by the tongue loads exerted on the draw bar 14 eventually cause holes in vehicle frame member 61 through which bolts 53A-C extend to elongate allowing the bumper hitch assembly 10 to become slanted downward toward the rear. With the present emphasis upon fuel economy, truck weights have been substantially reduced partially through the use of lighter frames. The lighter truck frames are even less capable of withstanding the torque forces exerted upon the short rear portions of the truck frame member 61.

Forward braces 30, secured to hitch frame 11 distributes load forces over a greater portion of the vehicle frame 60. Each forward brace 30 is affixed to the hitch frame 11 by means of bolts 39 extending through holes 34 in the forward brace 30 and through a corresponding hole in the forwardly extending member 15 and 16.

Normally bumpers of this type are mounted on trucks with either a 34 inch or 38 inch wide truck frame. It is most advantageous to only maintain an inventory of one size bumper hitch which would be adaptable to all truck frames. Referring now to FIGS. 3 and 4, the forward brace 30 had a cross-sectional "L" shape including an upward projecting 31 and a laterally extending portion 32.

Referring now to FIG. 4, looking rearward at a cross-sectional portion of the assembly, forward brace 30 is shown mounted on the forwardly extending member 15 normally on the driver's side of the vehicle. The laterally extending portion 32 extends to accommodate larger truck frame sizes; whereas in FIG. 3, on the passenger side, the laterally extending portion 32 projects inward to accommodate narrower truck frame sizes.

Forward brace 30 includes an extendable abutment surface 35 positioned in abutting relationship with the truck frame member 61. As illustrated, the extendable abutment surface 35 is located on the top surface of adjustment bolt 38 which is secured to the laterally extending portion 32 of forward brace 30 by means of upper lock nut 36 and lower lock nut 37. Thus, the extendable abutment surface 35 can be raised or lowered by simply loosening the locking nuts 36 and 37 and rotating bolt 38 in an appropriate manner. The extendable abutment surface 35 may take many different forms. For example, the extendable abutment surface 35 may be held in place by means of shims, or the laterally extending surface itself may be threaded to receive adjustment bolt 38, or holes 33 and 34 in forward brace 30 may be elongated vertically to allow forward brace 30 to shift up or down as needed.

It will be readily appreciated that forward brace 30 can be affixed to the truck frame 60 by suitable means such as bolts to project downward in abutting relationship with the hitch frame 11 merely reversing the relationship of such components. Further, in some applications the laterally extending portion 32 of the forward brace 30 may not be needed, in which case forward brace 30 would consist of the vertically extending portion 31 and the extendable abutment surface 35.

Referring now to FIG. 2, forwardly extending members 15 and 16 are equipped with holes 22 along its length space correspondingly to the holes in forward brace 30. Forward brace 30 can be mounted in various predetermined positions along the length of the forwardly extending members 15 and 16 to avoid obstructions under the vehicle frame 60 to provide a good bearing surface for the extendable abutment surface 35.

Rear bracket 50 is secured to forwardly extending member 15 by means of bolts 54 extending through upper holes 52a (not shown) suspending the hitch frame 11 in close proximity to the truck frame 60. However, for some applications it is desirable to suspend the hitch frame 11 further from the truck frame 60 positioned closer to the ground. Removal of bolts 54 allows the hitch frame 11 to be lowered such that holes in the forwardly extending members 15 and 16 are aligned with lower holes 52(b) in bracket 50. Hitch frame 11 is resecured in the lower position by bolts 54 extending through lower holes 52(b). Forward brace 30 is equipped with similarly spaced upper and lower holes 33 and 34 respectively. Removal of bolts 39 allows the remounting of the forward brace 30 in an upward extending position as shown in FIG. 3 or in a lower position as shown in FIGS. 2 and 4.

In operation, the forward brace and the extendable abutment surface 35 prevents the cantilever force exerted on the tow bar 14 to exert a torque force on bolts 53A-C which would tend to elongate holes in the truck frame member 61. Rotational forces are directed upward against the truck frame member 61 at the point of contact with extendable abutment surface 35 with the truck frame member 61. Thus, forward brace 30 and extendable abutment surface 35 distributes the tow load over a larger area of the truck frame thereby reducing stress on the vehicle 60 frame. With the present invention, wear of vehicle frame holes receiving bolts 53A-C will tend to elongate together in a more vertical manner rather than the twist pattern produced by the use of rear brackets 50 alone. As the holes receiving bolts 53A-C become elongated through wear, and hitch frame 11 is suspended correspondingly lower beneath the truck frame 60, the extendable abutment surface 35 can be readily adjusted by releasing locking nuts 36 and 37 and rotating bolt 38 accordingly. The improved hitch assembly is also readily raised or lowered by the mere removal and resecuring of eight bolts 39 and 54.

The improved bumper hitch apparatus 10 of the present invention provides flexibility in application. The forward braces 30 are adjustable fore-and-aft along the forwardly extending members 15 and 16. Further, the extendable abutment surface 35 allows the forward brace to abut against the surface of a frame member with adjustments for various makes of vehicles and for wear on the vehicle frame 60 and the hitch assembly 10 itself. The improved bumper hitch 10 is adaptable to a wide variety of vehicles having an inward and outward adjustment by positioning the laterally extending portion 32 of forward brace 30 inward or outward. A bumper hitch apparatus 10 of a single configuration can be mounted on all current makes and models of truck vehicles whether wide or narrow frame, two or four wheel drive. The teachings of the present disclosure are applicable to all bumper hitches having a frame means which includes forwardly extending members.

Having thus disclosed in detail a preferred embodiment of the invention, persons skilled in the art will be able to modify certain of the structure which has been disclosed into substitute equivalent elements for those illustrated while continuing to practice the principle of invention; and it is, therefore, intended that all such modifications and substitutions be covered as they are embraced within the spirit and scope of the appended claims.

We claim:

1. A trailer hitch apparatus adapted to mount to the frame of a vehicle for towing a trailer comprises:
   a hitch frame;
   a rear mounting bracket means including securing means, said bracket means being adapted to be secured to said hitch frame and said vehicle frame by securing means;
   towing means affixed to said hitch frame for receiving said trailer;
   at least one forward brace means having an extendable abutment surface and including mounting means, said forward brace means adapted to be mounted to one of said frames by said mounting means, said abutment surface adapted to be extended to engage the opposite frame to spread towing loads over a greater portion of said vehicle frame.

2. The apparatus of claim 1 wherein said forward brace is mounted to said hitch frame and said extendable abutment surface is extendable to engage said vehicle frame.

3. The apparatus of claim 1 wherein said rear bracket means and forward brace means are each adapted to be secured to said hitch frame in one of a plurality of corresponding predetermined vertical positions to allow said trailer hitch apparatus to be mounted at differing vertical distances beneath said vehicle frame.

4. The apparatus of claim 1 wherein said forward brace is adapted to be secured to said hitch frame in one of a plurality of predetermined horizontal positions along the length of said hitch frame to allow said forward brace means to engage said vehicle frame in avoidance of obstructions.

5. The apparatus of claim 1 wherein said forward brace means further comprises a laterally extending portion including said abutment surface, said laterally extending portion of said forward brace means adapted to be mounted in one of a plurality of laterally extending positions to adjust for variations in vehicle frames.

6. The apparatus of claim 1 wherein said towing means is extendable from said hitch frame to facilitate the attachment of said trailer to said trailer hitch apparatus.

7. In a trailer hitch apparatus adapted to mount to the frame of a vehicle for towing a trailer, including a hitch frame; rear mounting bracket means including securing means, said rear bracket means adapted to be secured to said hitch frame and said vehicle frame; and towing means affixed to said hitch frame for receiving said trailer, the improvement comprises: at least one forward brace means including mounting means and a laterally extending portion having an extendable abutment surface, said forward brace means adapted to be mounted in one of a plurality of predetermined laterally extending positions to said hitch frame by said mounting means, said abutment surface adapted to extend to engage said vehicle frame to distribute towing loads over a greater portion of said vehicle frame.

8. The apparatus of claim 7 wherein said rear mounting bracket means and forward brace means are each adapted to be secured to said hitch frame in one of a plurality of corresponding predetermined vertical positions to allow said trailer hitch apparatus to be mounted at various vertical distances beneath said vehicle frame.

9. The apparatus of claim 7 wherein said forward brace means is securable to said hitch frame at predetermined horizontal orientations along the length of said hitch frame to allow said forward brace means to engage to said vehicle frame in avoidance of obstructions.

10. The apparatus of claim 7 wherein said extendable abutment surface includes a threaded shaft having two ends and nut means, said shaft threadably secured to said laterally extending member by nut means at one end and having abutment face on said other end for engaging said vehicle frame.

11. The apparatus of claim 7 wherein said towing means is extendable from said hitch frame to facilitate the attachment of said trailer to said trailer hitch apparatus.

12. A trailer hitch apparatus adapted to be mounted to the frame of a vehicle for towing a trailer comprises:
a hitch frame;
a rear mounting bracket means including securing means, said bracket means being adapted to be secured to said hitch frame in one of a plurality of vertical positions and to said vehicle frame by said securing means;
towing means affixed to said hitch frame for receiving said trailer;
at least one forward brace means including an upward projecting portion, a laterally extending portion having an extendable abutment surface, and mounting means, said forward brace means being adapted to be mounted to said hitch frame by said mounting means while extending in one of a plurality of lateral directions, and mounted in one of a plurality of predetermined horizontal positions along the length of said hitch frame in avoidance of obstructions, and mounted in one of a plurality of vertical positions corresponding to the vertical position of said rear mounting bracket, said extendable abutment surface extendable to engage said vertical frame to distribute towing loads over a greater portion of said vehicle frame.

* * * * *